July 11, 1967     W. J. CAGLE     3,330,235
VALVE FOR A SEED PLANTER OF THE HILLDROP TYPE
Filed Nov. 27, 1964
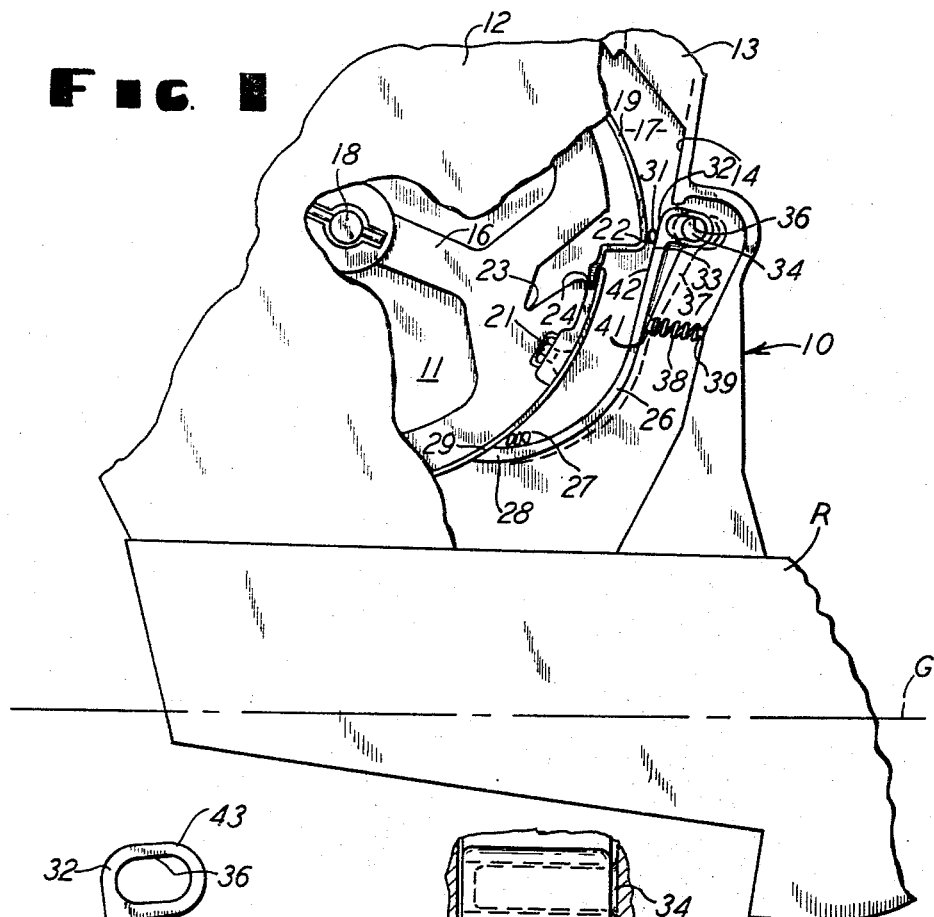
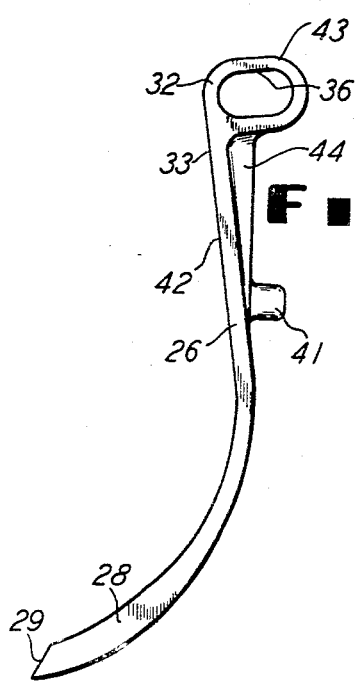
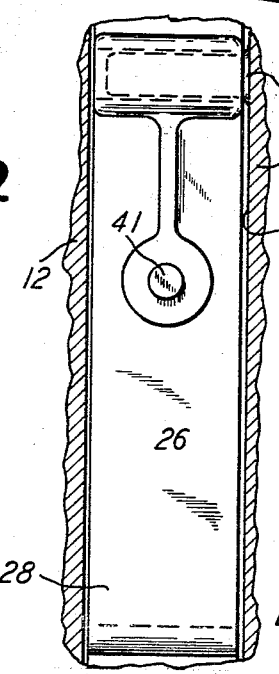
INVENTOR:
WESLEY J. CAGLE
BY: *Arthur J. Hanemann*
ATTORNEY

# United States Patent Office 3,330,235
Patented July 11, 1967

3,330,235
VALVE FOR A SEED PLANTER OF THE HILLDROP TYPE
Wesley J. Cagle, Pecatonica, Ill., assignor to J. I. Case Company, Racine, Wis., a corporation of Wisconsin
Filed Nov. 27, 1964, Ser. No. 414,127
6 Claims. (Cl. 111—51)

This invention relates to a valve for a seed planter of the hilldrop type.

Hilldrop seed planters are utilized for planting groups of seeds such as three or four seeds, together in a row while the planter is continuously moved over the ground for the combined action of forming a furrow in the ground, dropping the groups of seeds in the furrow, and finally covering the seeds with dirt. The hilldrop type of planter utilizes a rotatably mounted wheel with radial projections which slide over a movable valve for periodic release of a group of seeds dropped onto or near the wheel by a metering device above the level of the wheel. Previous planters have been concerned with simple but yet effective mechanisms for accumulating and dropping the seed, and to do so without cracking or crushing any of the seeds in the planter mechanism, and particularly, without crushing the seeds between the radial projections and the valve which is disposed immediately beyond the radial projections. To date, there has been no solution to the problem of seed damage by having the seed caught between the wheel and the valve, but some planters somewhat avoid the problem by placing the valve at an angle to the periphery of the wheel other than a tangential angle so that only the lower end, for instance, of the valve contacts the wheel periphery and the remainder of the valve is far away from the periphery. However, this type of mechanism is not accurate in its collection of seeds in selected numbers such as either three or four, and therefore this is not an answer to the problem of providing an effective valve which will not damage the seeds.

Accordingly, it is a general object of this invention to provide a valve for a hilldrop type of seed planter, wherein the valve is an improvement over those heretofore known and avoids the problem of seed damage by pressure between the wheel and the valve.

Still another object of this invention is to overcome the aforementioned problems with presently-known planters, and yet have the planter, particularly the valve, effective for desired accurate collection of seeds in a selected number of for instance three or four to a group.

Still a more specific object of this invention is to provide a valve for a hilldrop type planter, wherein the entire valve is displaceable toward and away from the wheel to avoid crushing any seed which might become lodged between the periphery of the wheel and the valve.

Still further objects of this invention are the provision of a valve for a hilldrop planter wherein the valve is arranged so that the seeds cannot become lodged or caught by the valve in a manner to be jammed in the mechanism or in any way interfere with the smooth operation of the mechanism, and the entire mechanism is designed for adaptation to various grouping of seed and for reliable and long wear in the mechanism and the various parts.

Other objects and advantages will become apparent upon reading the following description in light of the accompanying drawings, wherein:

FIG. 1 is a side elevational view of a fragment of a hilldrop planter showing a preferred embodiment of this invention with parts thereof broken away and with the valve shown in a second position by the dotted lines.

FIG. 2 is an enlarged side elevational view of the valve shown in FIG. 1.

FIG. 3 is a rear elevational view of FIG. 2 and with a fragment of the planter housing added thereto.

The planter is shown to consist of a planter housing generally designated 10 and disposed above a runner opener R which operates in the ground as shown by the ground line designated G. The runner R of course opens a furrow in the ground for the deposit of seeds by the planter in groups of three or four for instance. The housing 10 has a side wall designated 11, on the far side thereof as viewed in FIG. 1, and it has a side wall designated 12, on the near side of FIG. 1. Also, a seed boot or passage tube 13 extends from a seed metering device (not shown) disposed above the shown portion of the planter in FIG. 1. It will therefore be understood that the seed will drop through the boot 13 and into a chamber defined by the housing side walls 11 and 12 and the end wall designated 14.

A dropper wheel 16 is rotatably mounted in the chamber designated 17, as described above, and the wheel 16 is rotatably mounted on its shaft 18 to rotate in a clockwise direction as shown in FIG. 1. The wheel 16 has radial projections 19 attached thereto by means of bolts 21, and several, preferably four, projections 19 exist on the wheel 16 and radially extend therefrom to the furthest limit indicated by the point designated 22. The projections 19 are actually in the form of flattened springs, and they can therefore be disposed in the extended position as shown in FIG. 1, that is radially outwardly, or they can be snapped radially inwardly and retained in a groove 23 on the wheel 16 with the tip 24 of the spring member 19 caught in the groove or notch 23 so that the spring member 19 is retained inwardly. In this manner, with four spring members 19 mounted on the wheel 16, any one or all of the members can be disposed in the operative or radially projected position as shown in FIG. 1, and thus the grouping of seeds is selectable.

The aforementioned construction is like that shown in my U.S. application Ser. No. 355,861 filed Mar. 30, 1964, now Patent No. 3,276,404.

Hilldrop planters normally utilize a valve adjacent the dropper wheel, and the valve is pivoted at its upper end and movable at its lower end to move radially outwardly under the urging of the radial projection or tip 22 when the latter passes the lower end. In this pivotal movement, the valve permits the group of seeds to drop to the ground as desired. In the present instance, a valve 26 is disposed in the housing chamber 17 and is located adjacent the periphery of the wheel 16 as shown. A group of seeds designated 27 is shown collected at the valve lower end 28, and it will of course be understood that when the projection 22 is rotated to the lower end 28, it will form a pocket with the valve 26 so as not to crush the seeds 27, but the projection 22 will pivot the valve lower end 28 and release the seeds 27. Thus the wheel 16, as measured by the width of the peripheral or spring pieces 19, and the valve 26, are both of a width only slightly less than the width of the planter chamber 17, and thus the seed cannot drop to the side of either the wheel 16 or the valve 26 but is instead guided therebetween. Also, the valve 26 is preferably made of a low friction material so that it will not place a great drag upon the wheel 16, and yet it is also made of a material and with the lower end enlarged so that it will have good wearing characteristics as the dropper wheel 16 constantly rotates over the lower surface 29 of the valve 26. It is this surface 29 which is enlarged as shown for good distribution of the wear on the surface 29.

It will be noted that the valve upper end 32 is disposed to have its facing surface 33 approximately aligned with the housing surface 14 so that the seed dropping from boot 13 will be smoothly guided down the passageway toward the ground. However, it will also be noted that with the valve surface 33 located adjacent and in close proximity to the radial projection 22 on the dropper wheel, any seed, such as the seed designated 31, can become pressed between the wheel 16 and the valve 26. Such action could either crack or crush the seed and thereby destroy it, or it could even jam the mechanism, or in the ultimate, it could even flex the spring member 19 to cause it to snap inwardly into the retracted position described earlier.

To avoid any detrimental lodging of seed between the wheel and the valve, the valve is provided with a lost motion connection at the upper end thereof so that it can be displaced radially outwardly away from the wheel. In the actual construction for the lost motion connection, a pin 34 is fixedly mounted on the planter housing 10, and a slot 36 is provided in the valve upper end 32 substantially radially of the wheel 16. It will therefore be apparent that if the seed 31 does become caught between the wheel and the valve, then the valve will be pushed radially away from the wheel to the dotted position designated 37, and the seed will not be damaged in any way, nor will the mechanism. Thus the pin and slot combination, effected by the pin 34 and the slot 36, provides for the desired release of the valve 26 at the upper end only, and only when necessary.

It will of course also be understood and noted that a compression type coil spring 38 is disposed between a pin 39 on the housing 10 and a guide pin 41 on the back surface of the valve 26. Still further, the valve front surface or face 42 is disposable in a position approximating at least the arcuate path of travel of the radial projection 22. This therefore means that any seed which drops into the chamber 17 after the mechanism gets to the position shown in FIG. 1, will not be able to pass to the valve lower end 28, and it is desired that it not pass since it is not to be added to the group 27. This therefore permits the valve 26 to stop the seed throughout the entire one-eighth revolution of the dropper wheel 16, that is between the valve upper end 31 and the lower end 28, and therefore the entire mechanism is more accurate and less critical in the metering of seeds through the tube or boot 13.

Further, the location of the spring 38 is approximately one-third the length of the valve 26 from the top of the valve. This arrangement provides for only contact of the lower end 28 of the valve against the wheel pieces 29, but yet the spring tension is such that it will not damage the seed which may become caught between the wheel and the valve upper end, but instead will compress to allow the seed to pass through without damage to it.

The valve 26 is shown provided with a boss 43 at the upper end thereof for accommodating the slot 36, and a rib 44 extends from the boss 43 to the stub 41 for adequate strength in the upper end of the valve 26. The location of the spring 38 is such that when the seed 31 is lodged as shown, it permits the upper end 32 to be displaced to the dotted position shown, it, however, maintains the upper end in the solid line position shown when the projection 22 contacts the valve lower end 28 and pivots the lower end outwardly.

While a specific embodiment of this invention has been shown and described, it should be obvious that certain changes could be made in the embodiment and the invention should therefore be determined only by the scope of the appended claims.

What is claimed is:

1. In a seed planter of the hilldrop type for use with a seed dropper wheel rotatably disposed in a confined chamber in the planter housing, a valve pivotally mounted on said planter housing and disposed in said chamber in cooperative relation to the periphery of said seed dropper wheel for holding seeds against the periphery of said seed dropper wheel for timely release of the seeds, resilient means operatively associated with said valve for yieldingly holding the latter against the periphery of said wheel, and pivot means connected between said planter housing and a portion of said valve and with the pivot axis being disposed parallel to the axis of rotation of said wheel, said pivot means including a lost motion connection between said valve and said planter housing and arranged for movement of said portion of said valve toward and away from said wheel under the influence of both said resilient means and seeds caught between said portion of said valve and the periphery of said wheel.

2. In a seed planter of the hilldrop type including a planter housing and a seed dropper wheel rotatably disposed in a confined chamber in said planter housing, a valve uprightly disposed and with the upper end pivotally mounted on said planter housing and disposed in said chamber with the lower end of the valve disposed in cooperative relation with said seed dropper wheel for holding seeds with said seed dropper wheel for timely release of the seeds, resilient means operatively associated with said valve intermediate said upper end and said lower end for yieldingly urging said valve toward said wheel, and pivot means connected between said planter housing and said upper end of said valve, said pivot means including a lost motion connection between said upper end of said valve and said planter housing and arranged for movement of said upper end of said valve toward and away from said wheel under the influence of both said resilient means and seeds caught between said upper end of said valve and said wheel.

3. In a seed planter of the hilldrop type including a planter housing and a seed dropper wheel rotatably disposed in a confined chamber in said planter housing and having a radial projection thereon, a valve uprightly disposed in said chamber radial to and with the lower end in cooperative relation with said wheel for holding seeds with said seed dropper wheel for timely release of the seeds by the rotation of said radial projection past said valve, said valve being radially movable with respect to said wheel at both the upper end and the lower end of said valve, resilient means operatively associated with said valve for yieldingly urging said valve radially toward and into contact with said wheel, and pivotal means radially movable with respect to said wheel and connected between said planter housing and the upper end of said valve and being self-adjusting radially toward and away from said radial projection of said wheel for radial displacement of said valve under the influence of both said resilient means and seeds caught between said upper end of said valve and said radial projection of said wheel.

4. In a seed planter of the hilldrop type including a planter housing and a seed dropper wheel rotatably disposed in a confined chamber in said planter housing and having a radial projection thereon, a valve uprightly disposed in said chamber radial to said wheel and with the lower end of and another portion of said valve both being disposed adjacent said wheel in cooperative relation with said wheel for both holding seeds with said wheel for timely release of the seeds by the rotation of said radial projection past said lower end, said valve being radially movable with respect to said wheel at both the upper end and the lower end of said valve, resilient means operatively associated with said valve for yieldingly urging said valve radially toward and into contact with said wheel and being of a strength less than that which would crack a seed caught between said wheel and said valve, and pivotal means radially movable with respect to said wheel and connected between said planter housing and the upper end of said valve and being self-adjusting radially toward and away from said radial projection of said wheel for radial displacement of said valve under the influence of both said resilient means and seeds caught between said upper end of said valve and said radial projection of said wheel.

5. In a seed planter of the hilldrop type including a planter housing and a seed dropper wheel rotatably disposed in a confined chamber in said planter housing and having a radial projection thereon, a valve uprightly disposed in and pivotally mounted at its upper end on said planter housing and with its lower end disposed in abutment with said seed dropper wheel for holding seeds with said seed dropper wheel for timely release of the seeds upon rotation of said radial projection past said lower end, the entire said valve being displaceable toward and away from said wheel at both said upper end and said lower end, resilient means operatively associated with said valve for yieldingly urging the latter toward said wheel, and limit means connected between said planter housing and said upper end of said valve and arranged for pivotal movement of said lower end of said valve and for limiting displacement of said upper end of said valve toward and away from said wheel under the influence of both said resilient means and seeds caught between the upper end of said valve and said wheel.

6. In a seed planter of the hilldrop type including a planter housing and a seed dropper wheel rotatably disposed in a confined chamber in said planter housing and having a radial projection thereon, a valve uprightly disposed in and pivotally mounted at its upper end on said planter housing and with its lower end disposed in abutment with said seed dropper wheel for holding seeds with said seed dropper wheel for timely release of the seeds upon rotation of said radial projection past said lower end, resilient means operatively associated with said valve for yieldingly urging the latter toward said wheel, and a pin and slot combination connected between said planter housing and said upper end of said valve and arranged for pivotal movement of said lower end of said valve and for limiting displacement of said upper end of said valve toward and away from said wheel under the influence of both said resilient means and seeds caught between said upper end of said valve and said wheel.

References Cited
UNITED STATES PATENTS

| | | | |
|---|---|---|---|
| 2,252,374 | 8/1941 | Hipple | 111—34 X |
| 3,142,275 | 7/1964 | Buhr | 111—51 |

ABRAHAM G. STONE, *Primary Examiner.*

A. E. KOPECKI, *Assistant Examiner.*